United States Patent [19]
Cuevas et al.

[11] Patent Number: 6,044,547
[45] Date of Patent: Apr. 4, 2000

[54] INTEGRATED CRIMP BIAS APPARATUS

[75] Inventors: Edward Cuevas, Pinole; Casey K. Ghaffari, San Francisco, both of Calif.

[73] Assignee: Veriflo Corporation, Richmond, Calif.

[21] Appl. No.: 09/118,865

[22] Filed: Jul. 20, 1998

[51] Int. Cl.[7] .............................. B23P 11/00; B23Q 15/00
[52] U.S. Cl. ..................... 29/715; 29/890.13; 29/517; 29/234; 29/283.5
[58] Field of Search ............ 29/890.13, 890.126, 29/516, 517, 715, 234, 243.517, 283.5 268

[56] References Cited

U.S. PATENT DOCUMENTS

| | | |
|---|---|---|
| 2,035,686 | 3/1936 | Briegel . |
| 2,190,464 | 2/1940 | Wile . |
| 2,211,008 | 8/1940 | Goldberg . |
| 3,028,776 | 4/1962 | Keller et al. . |
| 3,083,750 | 4/1963 | Macleod et al. . |
| 3,111,157 | 11/1963 | Henry . |
| 3,175,281 | 3/1965 | Elfsten . |
| 3,330,023 | 7/1967 | Frye et al. . |
| 3,332,272 | 7/1967 | Tonchen . |
| 3,335,594 | 8/1967 | Peterman et al. . |
| 3,335,598 | 8/1967 | Jessen . |
| 3,453,831 | 7/1969 | Rusche . |
| 3,651,889 | 3/1972 | Humphrey . |
| 3,787,950 | 1/1974 | Bagby ...................................... 29/237 |
| 4,178,679 | 12/1979 | Lichtenstein ............................ 29/715 |
| 4,286,372 | 9/1981 | Batcheller ................................ 29/516 |
| 4,567,650 | 2/1986 | Balyasny et al. ....................... 29/283.5 |
| 4,854,031 | 8/1989 | Eisenzimmer . |
| 5,458,001 | 10/1995 | Ollivier . |
| 5,467,529 | 11/1995 | Gilchrist et al. . |
| 5,509,390 | 4/1996 | Tuckey . |
| 5,536,100 | 7/1996 | Kiefer ...................................... 29/516 |
| 5,680,703 | 10/1997 | Ono et al. . |
| 5,772,261 | 6/1998 | Magram . |
| 5,799,383 | 9/1998 | Baldwin et al. . |

*Primary Examiner*—David P. Bryant
*Attorney, Agent, or Firm*—Antonelli, Terry, Stout & Kraus, LLP

[57] ABSTRACT

The reliability of a gas pressure regulator is ensured through the use of the disclosed integrated crimp bias apparatus and method for biasing and crimping components of a diaphragm subassembly for the regulator. Omission of crimping of the components after biasing during forming of the diaphragm subassembly for the regulator is avoided by automatically locking at least one of the components of the subassembly in the apparatus before biasing and automatically releasing the locking only after crimping of the biased components. A pincerlike crimper of the apparatus includes a pair of pincers working on a pivot, each pincer having a handle to which a force can be applied and a grasping jaw for exerting a crimping pressure on the components. Grasping jaws each have two crimping elements which oppose respective ones of the crimping elements on the opposing grasping jaw during crimping. A fixture holds the components to be biased and crimp connected. The fixture and components held therein are moveable into and out of a position for crimping from an initial position thereof where biasing is performed.

22 Claims, 10 Drawing Sheets

INTEGRATED CRIMP BIAS APPARATUS

FIELD OF THE INVENTION

The present invention is directed to an improved method and apparatus for forming a crimped connection and, more particularly, to an integrated crimp bias apparatus and method for forming a diaphragm subassembly for a gas pressure regulator.

BACKGROUND AND SUMMARY OF THE INVENTION

A known gas pressure regulator, diaphragm subassembly therefor and method of making same are disclosed in commonly owned U.S. Pat. No. 5,458,001 to Ollivier. A sequence of operations which has been employed in the past to form the diaphragm subassembly for the regulator includes mounting the components of the diaphragm subassembly in a diaphragm alignment fixture where the components are aligned, and then biasing the diaphragm a predetermined amount in the direction of the valve seat and compression member and thereafter further threading the valve or poppet of the diaphragm subassembly into the welded diaphragm plate of the subassembly so it comes into contact with the valve seat thereof. This condition is determined by observing a deflection of 0.001 inch of the diaphragm plate along the longitudinal axis of the valve using a suitable indicator during turning of the valve and its valve stem relative to the diaphragm plate as discussed in U.S. Pat. No. 5,458,001. This sets the biased position of the valve relative to the diaphragm plate. Thereafter, the diaphragm subassembly is removed from the diaphragm alignment fixture and inserted into a three jaw chuck crimper wherein an upper portion of the extension of the diaphragm plate receiving the valve stem is crimped to fix the relative position of the valve and diaphragm plate. The crimped diaphragm subassembly is then removed from the crimper and remounted on the diaphragm alignment fixture where a reverse torque test is performed on the crimped subassembly to determine whether the valve stem is properly crimped within the extension of the diaphragm plate.

This known sequence of operations and the related apparatus for performing them have been found to be disadvantageous in that they do not absolutely guard against accidental omission of the crimping operation during the manufacture of the diaphragm subassembly and the subsequent use of a biased, uncrimped diaphragm assembly in a regulator which can lead to failure of the regulator. They also require considerable handling of the parts of the subassembly with the attendant possibility for handling damage thereto. Further, the known method and apparatus require considerable assembly time and, because of the several handlings of the components, the opportunity for undesirable particle generation in a cleanroom application is increased.

The amount of crimp made by the three jaw chuck crimper is also imprecise which increases the scrap rate during manufacture. This problem is aggravated by problems in alignment of the biased subassembly with respect to the three jaw chuck crimper which can occur when the biased subassembly is mounted in the crimper for crimping.

An object of the present invention as to provide an improved method and apparatus for forming a diaphragm subassembly for a gas pressure regulator which avoid the aforementioned drawbacks and limitations of this known method and apparatus. More particularly, an object of the invention is to provide an improved method and apparatus for forming a crimped connection between parts of a diaphragm subassembly which prohibit the regulator failure mode caused by an operator's forgetting to crimp the subassembly during its manufacture, and which minimize parts handling and assembly time and also particle generation for cleanroom application while enabling fine control of the intensity of the crimp to permit rework on the diaphragm assembly, if necessary.

These and other objects are attained by the integrated crimp bias apparatus and the related method of the invention for forming a diaphragm subassembly for a gas pressure regulator wherein the apparatus comprises a fixture for holding components of the diaphragm subassembly to be biased relative to one another and connected together by a crimped connection between components thereof, means for biasing the components relative to one another, a crimper for engaging and deforming one of the components into another for forming the crimped connection, and a locking mechanism responsive to the presence of at least one of the components in the fixture to prevent removal thereof from the fixture before the crimped connection has been made. In this way, a predominant failure mode is prohibited by ensuring that each biased subassembly is crimped. Parts handling is minimized and assembly time reduced by aligning, biasing and crimping the subassembly in a single apparatus. Particle generation is also minimal for cleanroom application.

The fixture of the apparatus of the disclosed embodiment supports the diaphragm subassembly components including an annular, flexible metal diaphragm with a diaphragm plate secured to a central portion of the flexible metal diaphragm, a compression member, a valve seat supported by the compression member, and a valve for opening and closing a gas passage through the valve seat. The valve has a valve stem which extends through a gas passage of the valve seat and into an extension of the diaphragm plate which is adapted to be crimped to fix the relative positions of the valve and diaphragm plate in the subassembly after the flexible metal diaphragm is biased from an initial neutral position toward the compression member and valve seat by the means for biasing and the valve is set in contact with the valve seat.

The apparatus of the disclosed embodiment also further comprises means responsive to the operation of the crimper in forming the crimped connection for unlocking the locking mechanism to permit removal of the components from the fixture after forming the crimped connection. This unlocking preferably occurs after a short time delay such as 20 seconds, to permit reverse torque testing of the crimped connection before withdrawal of the subassembly from the fixture.

According to another feature of the invention, the crimper of the apparatus is a pincerlike crimper which includes a pair of pincers each having a handle to which a force can be applied and a grasping jaw for exerting a crimping pressure on the components to be crimp connected working on a pivot. The grasping jaws include a plurality of crimping elements in the form of pins carried by the grasping jaws for engaging and deforming a tubular member of the subassembly into the valve stem within the tubular member. The crimped connection is made by the application of a force at the handles turning the pincers at the pivot for exerting crimping pressure on the tubular member. In the disclosed embodiment, two crimping pins are carried by each of the grasping jaws. The pins oppose one another on opposite sides of the tubular member during crimping. Means are preferably provided for adjusting the relative position of the crimping pins with respect to their grasping jaws to obtain uniform crimping and adjust for wear of the pins.

These features of the invention advantageously permit the intensity of the crimp to be finely adjusted for obtaining a predetermined crimp without excessive deformation of the tubular member. Therefore, it is possible to rework components of a diaphragm assembly thereby reducing scrap during manufacture. The apparatus and method of the invention for forming a crimped connection between a first, tubular member and a second member extending within the first member also have applicability for connecting components other than those of a diaphragm subassembly for a gas pressure regulator.

A method of the invention for forming a crimped connection between a first, tubular member and a second member extending within the first member comprises holding at least one of the members to be crimp connected in a fixture which prevents at least the one member from being removed from the fixture before a crimped connection between the members has been made by a crimper, forming a crimped connection between the members with a crimper and removing the crimp connected members from the fixture. In the disclosed embodiment for forming a diaphragm subassembly, the diaphragm subassembly is aligned and biased in the fixture and thereafter the fixture and biased subassembly are moved together, without removing the subassembly from the fixture, into a position for performing the crimping with the crimper. After crimping, the fixture with crimped subassembly is returned to its initial position and the subassembly is reverse torque tested and then removed from the fixture of the apparatus for assembly into a gas pressure regulator.

These and other objects, features and advantages of the apparatus and method of the present invention will become more apparent from the following detailed description of a disclosed embodiment of the invention as illustrated in the accompanying drawings.

DETAILED DESCRIPTION OF THE DISCLOSED EMBODIMENT

Figure 1:
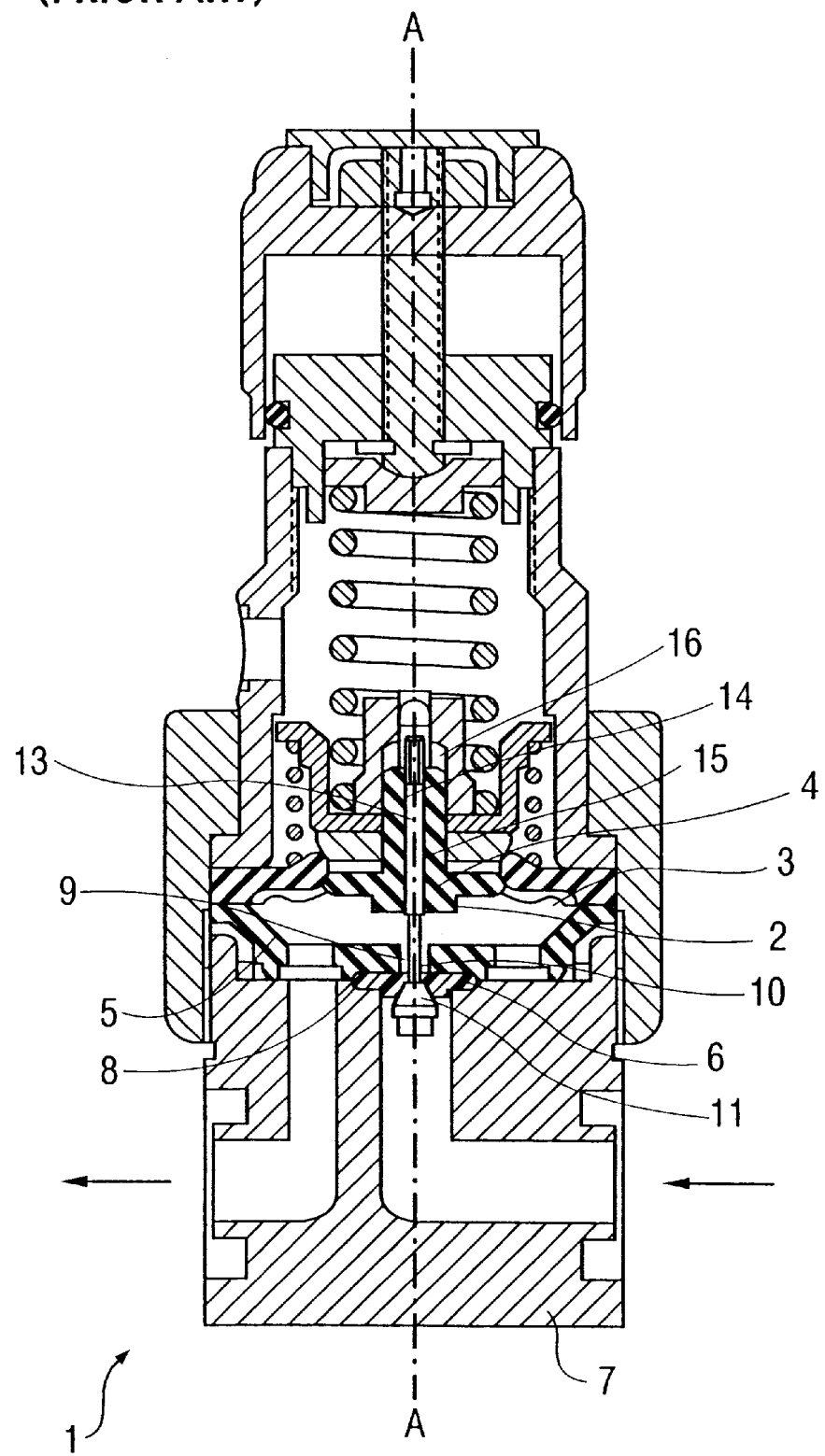
FIG. 1 is a cross sectional view through a longitudinal section through the center of a conventional gas pressure regulator which includes a diaphragm subassembly.

Referring now to the drawings, a conventional gas pressure regulator 1 which includes a diaphragm subassembly 2 is depicted in FIG. 1. See commonly owned U.S. Pat. No. 5,458,001 the disclosure of which is hereby incorporated by reference. The diaphragm subassembly 2 of the regulator 1 includes an annular, flexible metal diaphragm 3 with a diaphragm plate 4 secured to the central portion of the flexible metal diaphragm as by welding.

The diaphragm subassembly 2 in FIG. 1 further comprises an annular, dish-shaped compression member 5 which supports a valve seat 6. When the diaphragm subassembly 2 is mounted in the gas pressure regulator 1, the compression member 5 presses the valve seat 6, at a lower central portion of the compression member, against the valve body 7 of the regulator with a force to seal the valve seat against the valve body and the compression member. The central, lower side of the compression member 5 is formed with an annular recess or cavity 8 in which the upper end of the valve seat 6 is positioned for centering the compression member with respect to the valve seat 6 and valve body 7 on the central longitudinal axis A—A of the regulator as shown in FIG. 1. A central passage 9 is formed through the compression member 5 and communicates with passage 10 through the valve seat 6. During operation of the regulator, the passage 10 is opened and closed by a valve 10 of the subassembly to regulate the pressure of the gas pressure downstream of the valve at the outlet 12 of the regulator.

The valve 10 includes a valve stem or poppet extension 13 which extends upwardly along the axis A—A of the regulator through the passage 10 of the valve seat 6 and passage 9 of the compression member 5 to the diaphragm plate 4. The valve stem 13 is connected to the diaphragm plate by screw threads 14 on the upper end of the valve stem and complementary screw threads at the upper end of a central, axially aligned passage 15 in the diaphragm plate 4. As discussed above and in the patent to Ollivier, before installation of the diaphragm subassembly 2 in the regulator 1, the diaphragm 3 and diaphragm plate 4 of the subassembly are biased, the position of the valve 11 relative to the diaphragm plate 4 is set, and the upper portion of the extension 16 of the diaphragm plate is crimped to fix the relative position of the valve and diaphragm plate.

Figure 2:
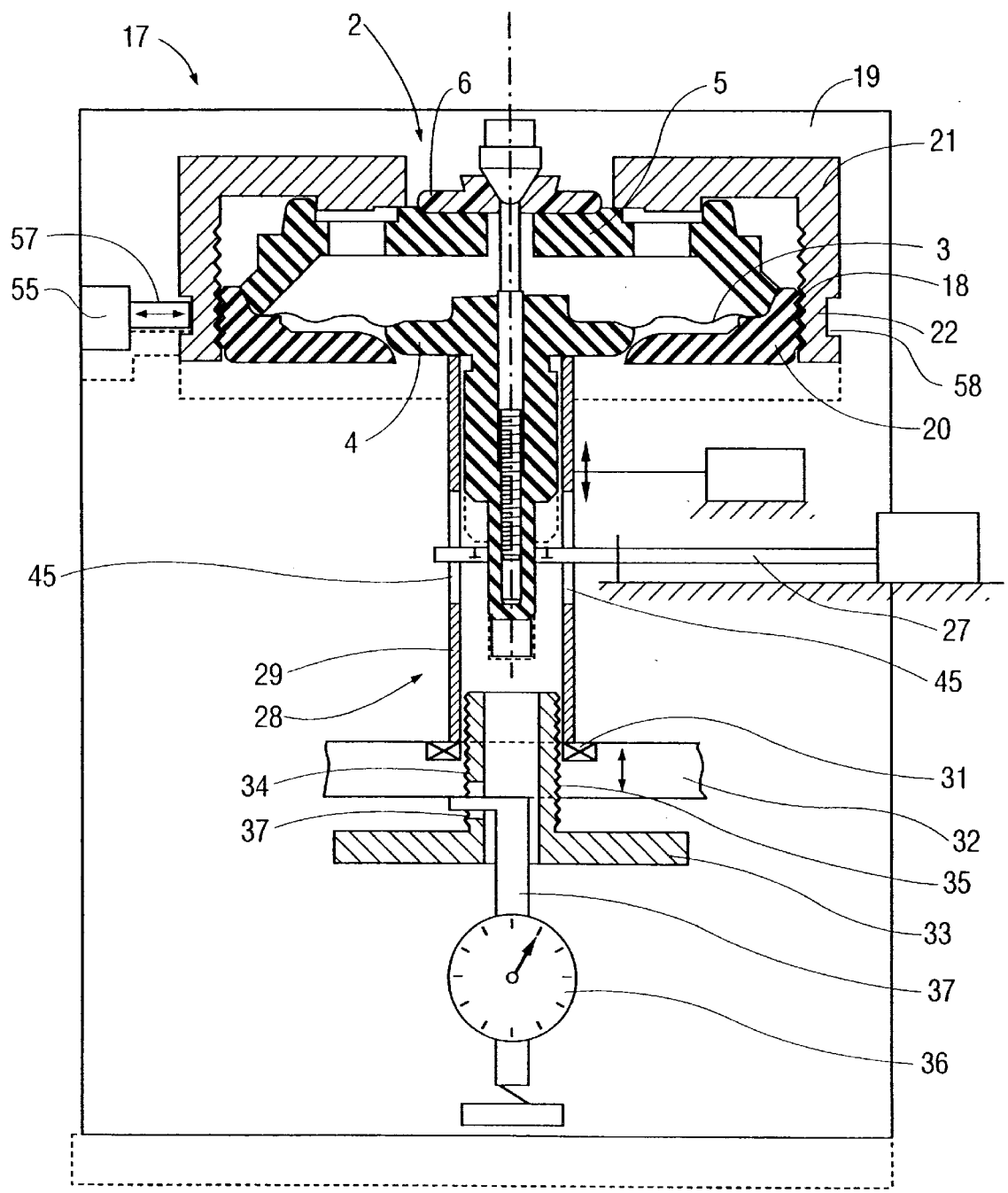
FIG. 2 is a schematic illustration, partially in cross section, of an integrated crimp bias apparatus according to the invention for making a diaphragm subassembly for use in a gas pressure regulator such as that depicted in FIG. 1.

An integrated crimp bias apparatus 17 of the invention is shown schematically, partially in cross section, in FIG. 2. The apparatus 17 is shown in use for making a diaphragm subassembly 2 of the type depicted in the regulator of FIG. 1. However, the invention is not limited thereto but is applicable for forming other diaphragm subassemblies for gas pressure regulators or, more generally, for forming a crimped connection between a first, tubular member and a second member extending within the first member. By way of a further example, the method and apparatus of the invention can be used to form diaphragm subassemblies for gas pressure regulators as disclosed in the commonly owned, co-pending U.S. patent application Ser. No. 09/021, 823, filed Feb. 11, 1998 the disclosure of which is hereby incorporated by reference.

The integrated crimp bias apparatus 17 in FIG. 2 comprises a fixture 18 for holding components of a diaphragm subassembly 2 to be biased with respect to one another and connected together by a crimped connection between components thereof. The fixture 18 is secured to a movable carriage or shuttle 19 of the apparatus and comprises a cup-shaped base 20 for receiving the diaphragm subassembly components to be biased and crimp connected, and a lid or cap 21 which is removeably connected to the base 20 by cooperating screw threads 22 on the base and cap. The inner surfaces of the cup-shaped base 20 and cap 21 are configured to cooperate with adjacent surfaces of the diaphragm subassembly 2 which is in an inverted position within the fixture as shown in FIG. 2, for centering and axially aligning the diaphragm subassembly components with respect to one another and the fixture 18 of the apparatus.

Figure 9:
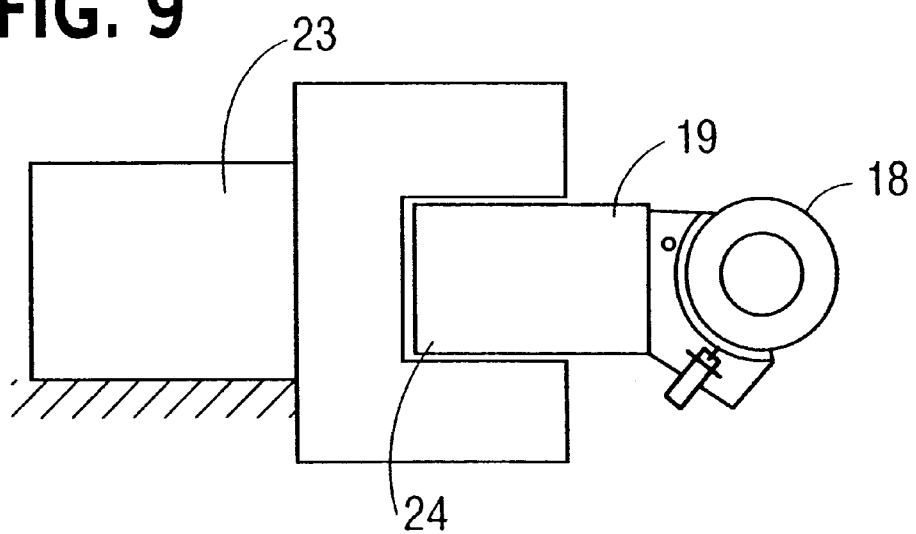
FIG. 9 is a schematic illustration of the top of the slide assembly for the magazine of the apparatus of FIGS. 5–8.
Figure 10:
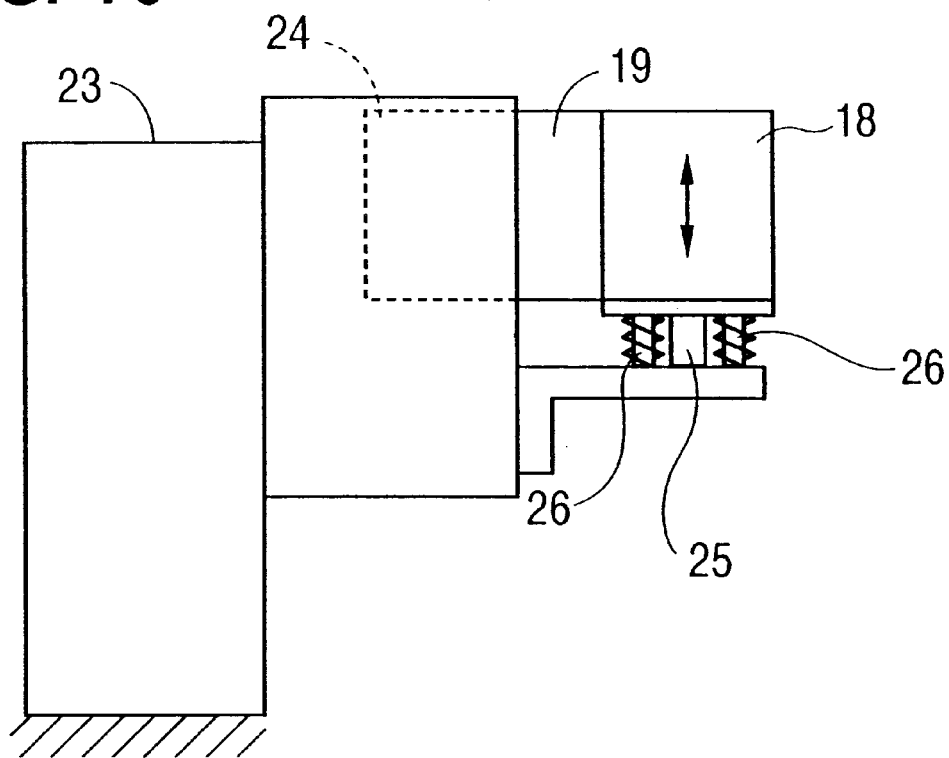
FIG. 10 is a schematic illustration of a front side view of the slide assembly for the magazine as depicted in FIG. 9.
Figure 11:
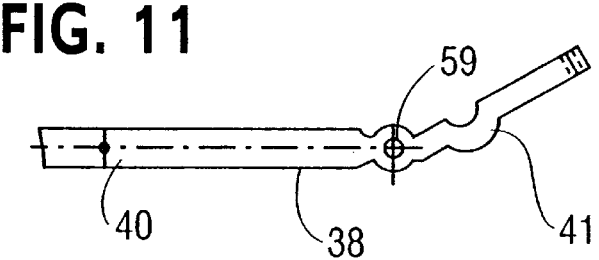
FIG. 11 is a top view of the left handle, right grasping jaw pincer element for the crimper in FIG. 5 as seen from the right side of FIG. 5.
Figure 12:
FIG. 12 is a side view of the planar pincer element of FIG. 11.
Figure 15:
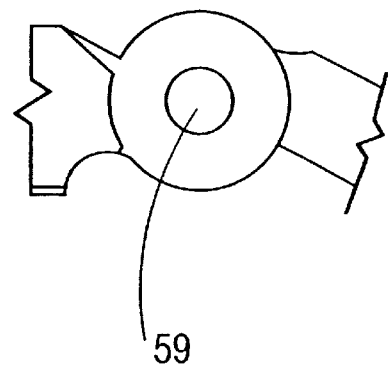
FIG. 15 is an enlarged view of the area of the element of FIG. 13 within dashed line circle B and showing the area where each of two identical pincer elements are pivotally connected to one another for pivoting about an upstanding mounting or pivot pin as shown schematically in FIG. 2 and a portion of which pin is visible in FIG. 7.
Figure 14:
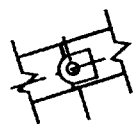
FIG. 14 is a side view of a portion of the pincer element of FIG. 13 taken in the direction of arrow A which corresponds to the axial direction of a threaded throughhole in the grasping jaw of the element for mounting a crimping pin.
Figure 13:
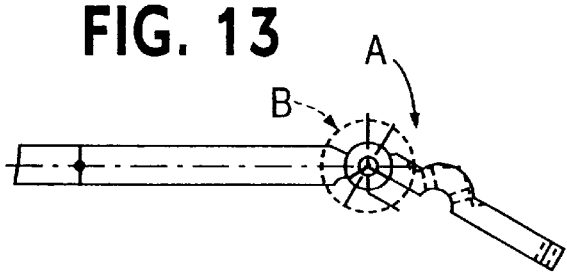
FIG. 13 is a bottom view of the pincer element of the crimper shown in FIG. 11.

The fixture 18 and shuttle 19 of the apparatus 17 are mounted for reciprocal vertical movement on the frame 23 of the apparatus by way of slide mechanism 24 shown schematically in FIGS. 9 and 10. The fixture 18 with diaphragm subassembly 2 and shuttle 19 are moved from an upper position illustrated in FIG. 2, to a lower position, shown in dashed lines in FIG. 2 by a shuttle air cylinder 25 upon actuation of the air cylinder. The downward movement of the fixture and shuttle is yieldably resisted by return springs 26 so that upon release of the pressurized air in cylinder 25, the fixture with diaphragm subassembly and shuttle return to their upper position as shown in FIG. 2. In the upper position of the fixture and shuttle, the diaphragm assembly is loaded and unloaded from the fixture and biased. Thereafter, for forming crimped connection between components of the diaphragm subassembly, the fixture with diaphragm subassembly and shuttle are moved to their lower position by actuation of the air cylinder 25 where the crimped connection of diaphragm subassembly components is formed by actuation of a crimper 27 of the apparatus. It has been found that this enables biasing of the diaphragm subassembly to be accomplished without intrusion of the crimper 27 upon the processes of centering, aligning and biasing the diaphragm subassembly prior to forming the crimped connection.

The apparatus 17 further comprises a means 28 for biasing the components of the diaphragm subassembly relative to one another. The biasing means 28 includes a bias tube 29 within which the extension 16 of the diaphragm subassembly is received. The upper end of the bias tube 29 contacts the lower surface of diaphragm plate 4 as depicted in FIG. 2 for transmitting a biasing force to the diaphragm subassembly. The lower end of the bias tube 29 is supported on the thrust bearing 31 carried by a bias wheel 32. An anchor 33 secured to the shuttle 19 supports a threaded shaft 34 thereon. The bias wheel 32 is mounted for rotation and consequent vertical translation on the shaft 34 by way of cooperating screw threads 35 on the shaft 34 and bias wheel 32. The bias tube 29 and anchor 33 with shaft 34 do not rotate but with rotation of the bias wheel 32 by the operator, vertical axial translation of the bias tube 29 and bias wheel 33 can be effected for setting the appropriate bias of the diaphragm subassembly. The amount of vertical translation during biasing is shown by indicator 36 whose plunger 37 is connected to and moves with the bias wheel 32 by way of a slotted aperture 37 in the shaft 34.

Figure 3:
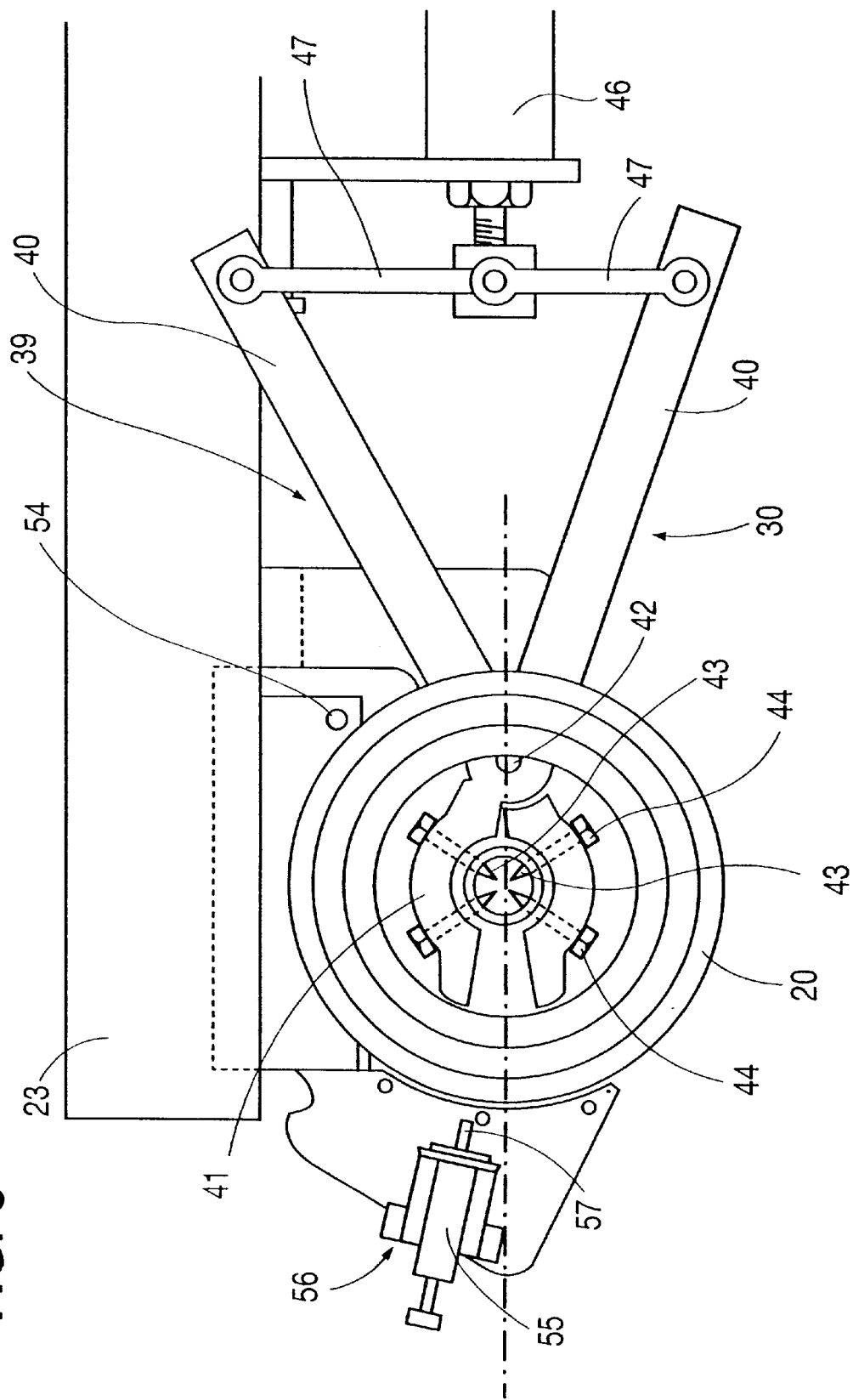
FIG. 3 is a schematic top view of a portion of the apparatus of FIG. 2 depicting the magazine of the apparatus for receiving components of a diaphragm subassembly and a crimper for forming a crimped connection between the components.
Figure 4:
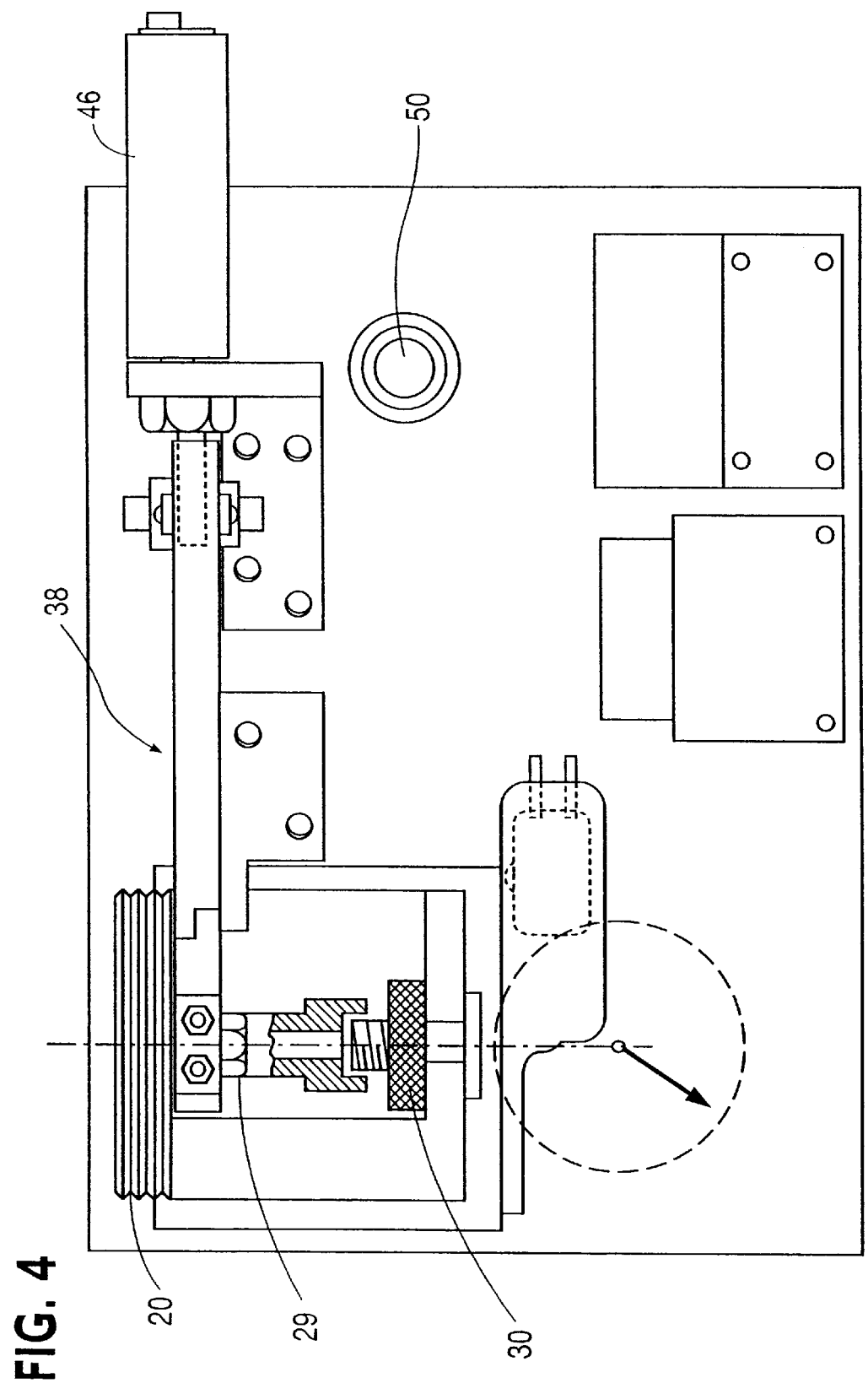
FIG. 4 is a schematic front view, partially in cross section, of the apparatus of FIG. 2.

The crimper 27 of the apparatus 17 is adapted to engage and deform or crimp the extension 16 of the diaphragm plate into the valve stem 13 for forming a crimp connection therebetween after the diaphragm of subassembly 2 in the fixture 18 has been biased and the position of the valve set with respect to the diaphragm plate. The crimper 27 includes a pair of pincers 38,39 each having a handle 40 to which a force can be applied and a grasping jaw 41 for exerting a crimping pressure on the components to be crimped connected, the pincers 38 and 39 working on a pivot 42. The grasping jaws 41 of the pincers each include a plurality of crimping elements in the form of crimping pins 43 carried by the grasping jaws for engaging and deforming the tubular extension 16 into the valve stem 13 for forming the crimped connection upon application of a force at the handles 40 turning the pincers about the pivot 42 for exerting crimping pressure on the tubular member. Each grasping jaw is provided with two crimping pins in the disclosed embodiment. The crimping pins are threadedly received in apertures in the grasping jaws. The position of the crimping pins relative to the grasping jaws is adjustable by nuts 44 on the outer ends of the crimping pins 43. The inner, pointed ends of the crimping pins 43 extend through longitudinally extending slots 45 formed in the bias tube 49 to engage the outer circumference of the extension 16 at locations opposite one another as seen in FIG. 3.

The crimper 27 is operated by a power air cylinder 46 which applies a crimping force to the working handles 40 of the pincers 38, 39 by way of links 47 connecting the output shaft of the power air cylinder 46 to the handles 40. The air pressure for operating the cylinder 46 is adjusted for setting a desired crimp force. Two electrically operated pneumatic valves 48 and 49 are arranged in series to obtain a cascade effect for operating the shuttle air cylinder 25 and the power air cylinder 46, respectively, e.g. first the electrically operated pneumatic valve 48 for the shuttle has to open whereupon shuttle air cylinder 25 moves the shuttle downwardly from the loading position shown in FIG. 2 to the crimping position shown in dash lines in FIG. 2. While the pneumatic valve 48 is open, the crimper 27 will operate with actuation of the pneumatic valve 49. This sequence of operations is initiated by the operator by depressing push button (PB) electrical switch 50.

A controller 51 coordinates the operation of the apparatus 17. A 110 volt alternating current is supplied to a 24 volt DC transformer for electrical control with suitable timers, not shown, being provided for setting the length of the crimping operation, actuation of power air cylinder 46 and the time for return of the carriage or shuttle 19 from the crimping position to the initial/unloading position by deactivation of the shuttle air cylinder 25. A sensor 52, in this case a Hall effect switch, is a feedback switch sensing the position of the piston in the power air cylinder 46 to provide an indication to the controller 51 that a crimp has been made. The piston of the power air cylinder 46 is made of magnetic material for this purpose.

Another feature of the integrated crimped bias apparatus 17 is a locking mechanism 53 which is responsive to closure of the fixture upon loading of the diaphragm subassembly components in the fixture to prevent removal of a diaphragm subassembly from the fixture before the crimped connection has been made. To this end, microswitch 54, a plunger type switch, extends upwardly from the fixture 18 adjacent the cup-shaped base 20 such that when the cap 21 of the fixture 18 is threadedly attached to the base 20 after loading diaphragm subassembly components in the fixture, the microswitch 54 is actuated by the cap 21. This, in turn, operates electrical solenoid 55 of a locking mechanism 56. In particular, operation of the solenoid 55 causes a locking pin 57 of the locking mechanism 56 to project outwardly from the locking mechanism into a circumferencial groove 58 of the cap 21 to prevent removal of the cap from the fixture 18 and unloading of the diaphragm assembly. This guards against removal of the diaphragm assembly after biasing without forming the crimp connection of the assembly. Operation of the crimper 27 detected by sensor 52, after a suitable time delay set on a timer, not shown, shuts off the power to the solenoid 55 by way of a power switch (PS), see FIG. 17, to withdraw the locking pin 57 from the groove 58 for unloading the crimped diaphragm subassembly from the apparatus 17.

Figure 5:
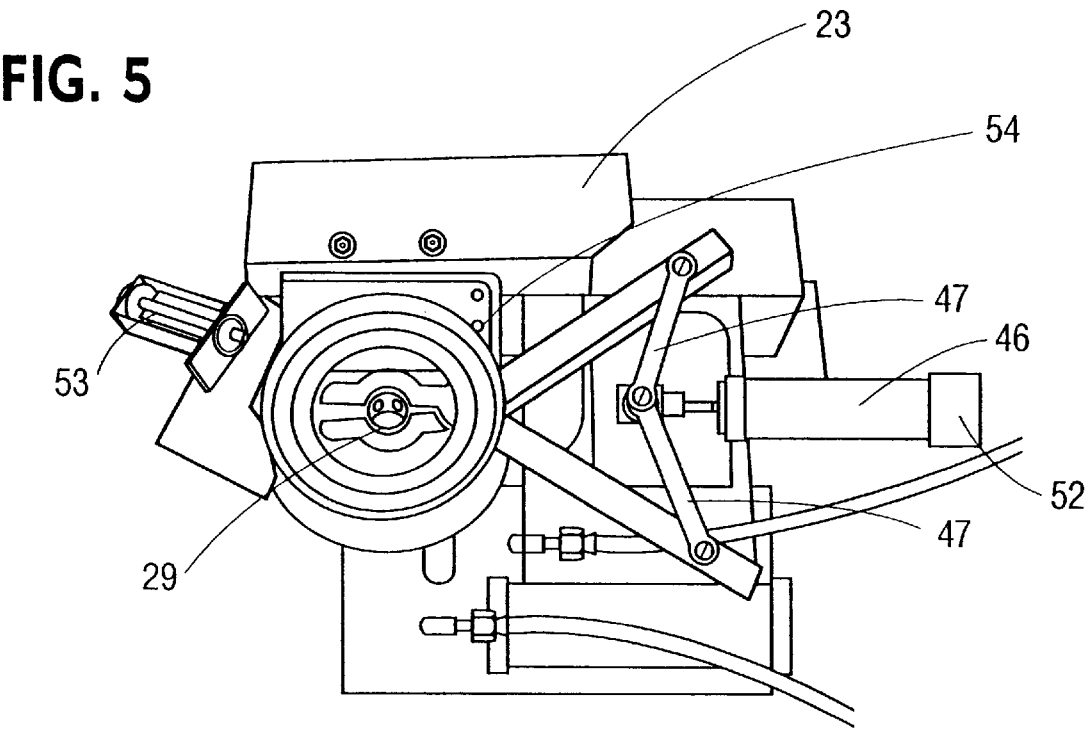
FIG. 5 is a top view of a preferred embodiment of the integrated crimp bias apparatus of the invention with the magazine of the apparatus being shown open.
Figure 6:
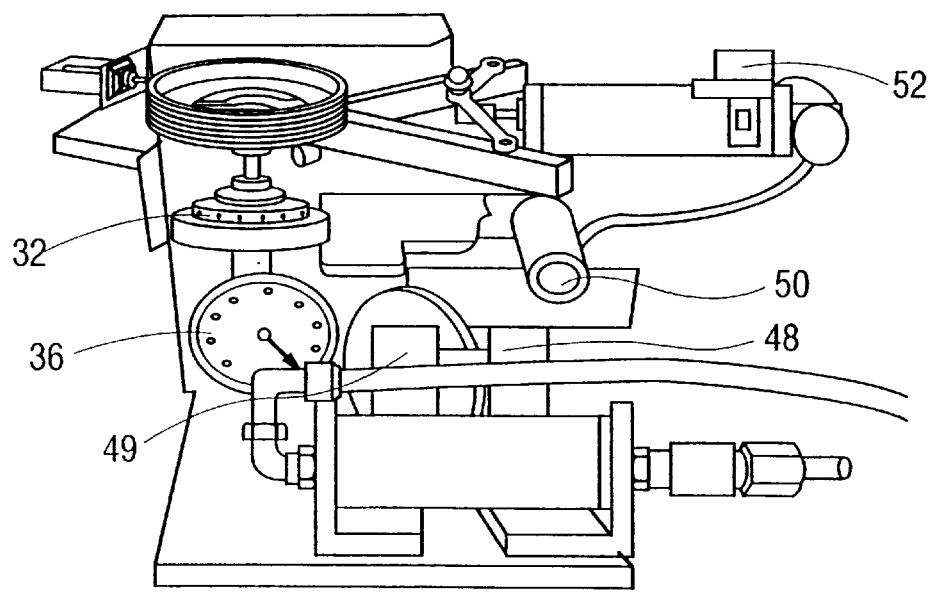
FIG. 6 is a front elevational view of the apparatus of FIG. 5.
Figure 7:
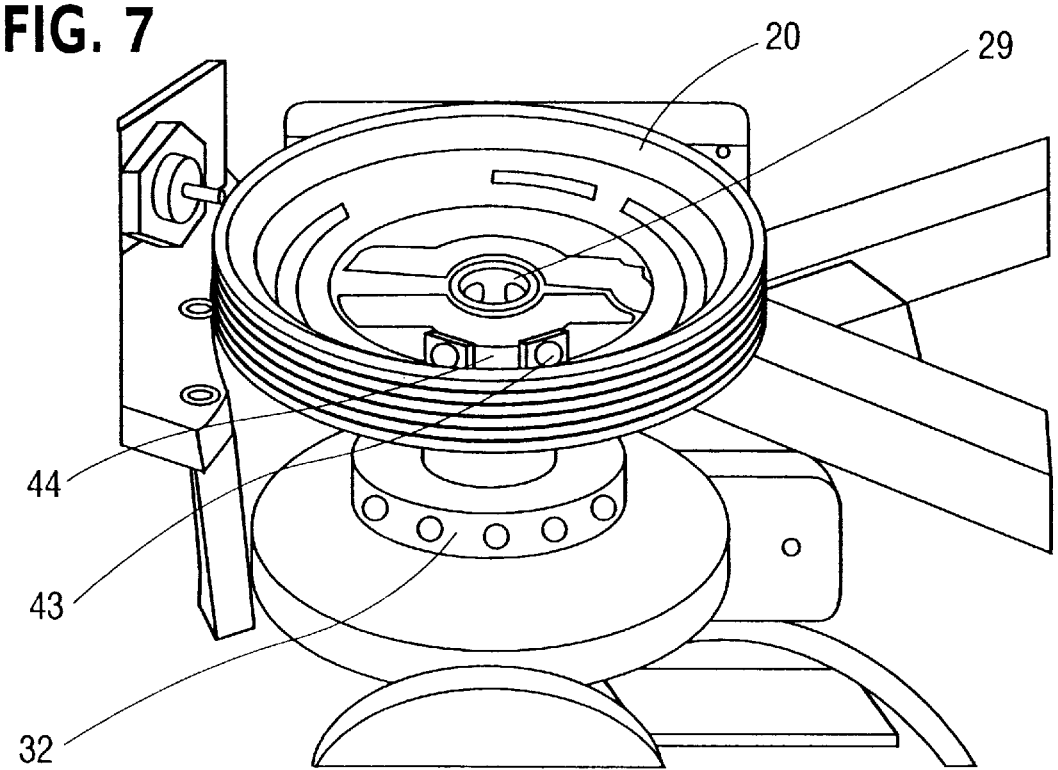
FIG. 7 is an enlarged perspective of a portion of the apparatus of FIGS. 5 and 6 from the front and above the apparatus.
Figure 8:
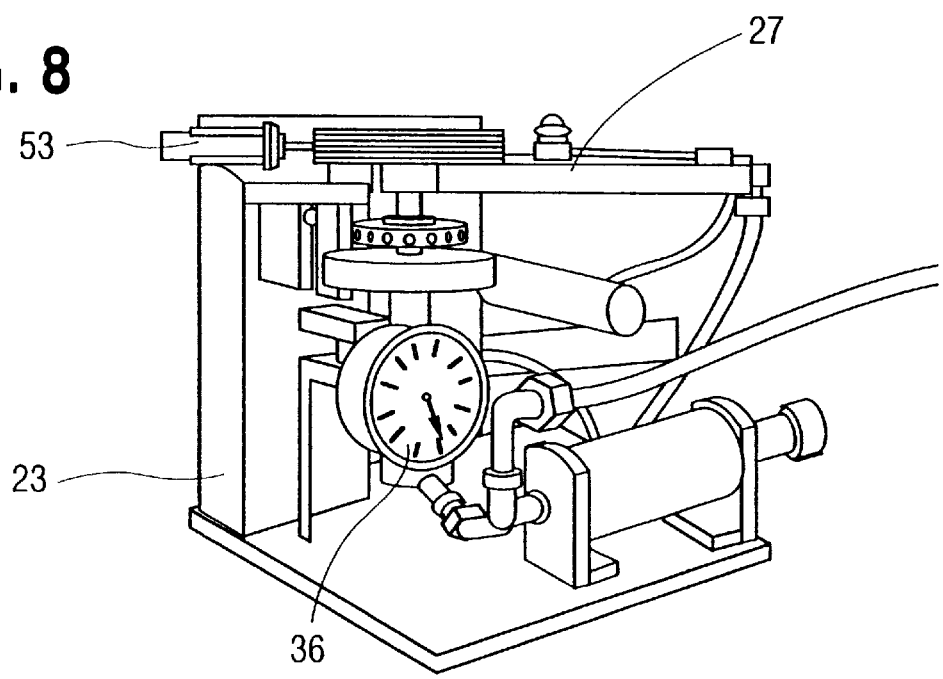
FIG. 8 is a perspective of the application of FIGS. 5–7 from the front and to the left side of the apparatus.

The pincer 38 of the crimper 27 is shown in more detail in FIGS. 11–15. The pincer 38 forms the left handle 40 and right grasping jaw 41 for the crimper as seen from the right side of the crimper in FIG. 5. The pincer 39 of the crimper has the same construction as the pincer 38. The pincers are intermeshed for relative rotation about pivot 42 of the apparatus which is received in aligned apertures 59 in the pincers. The pin c ers and other components of the apparatus are preferably formed of stainless steel such as a 17-4 PH alloy.

Figure 16:
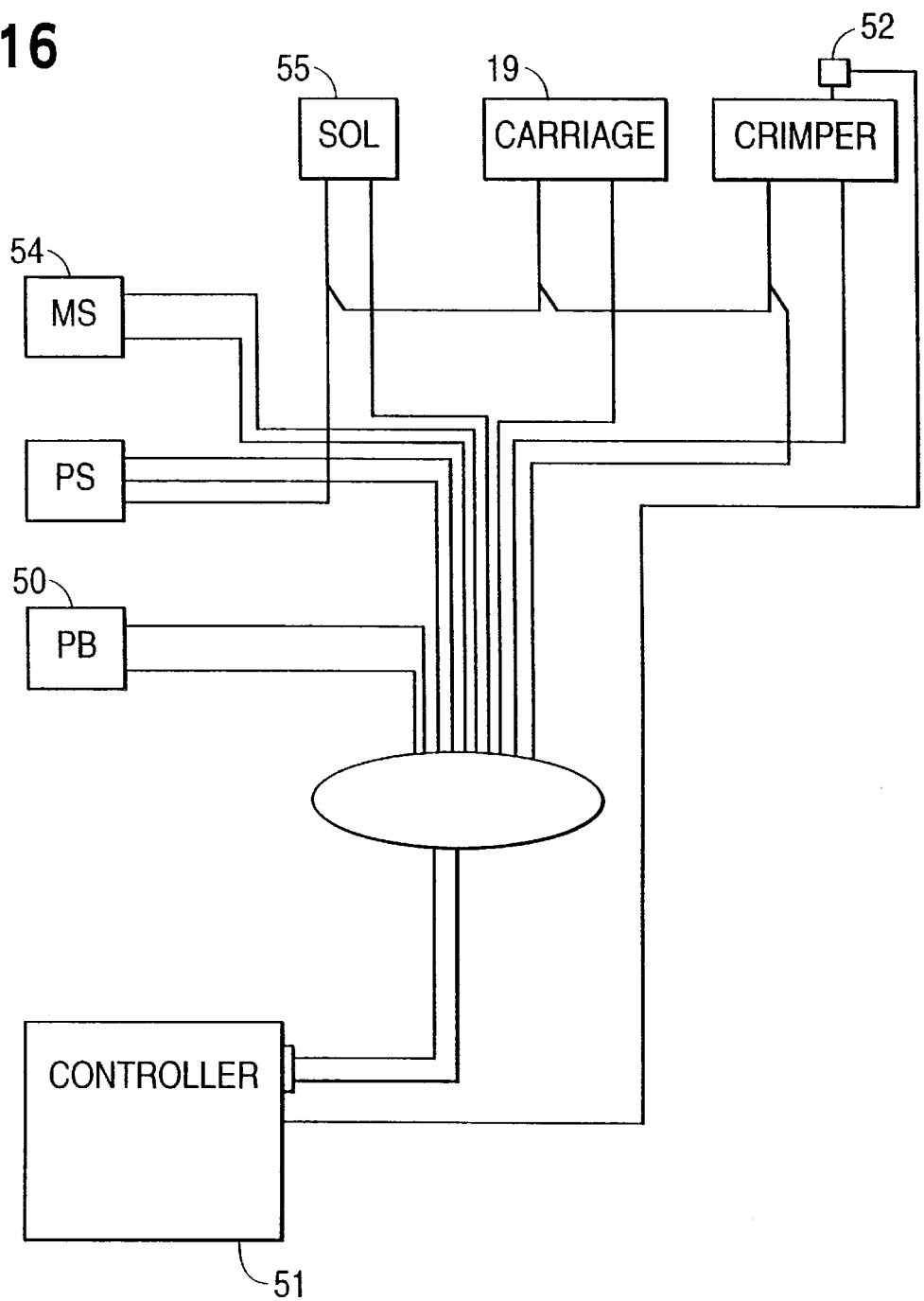
FIG. 16 is a schematic electrical wiring diagram of the apparatus of FIGS. 5–8.
Figure 17:
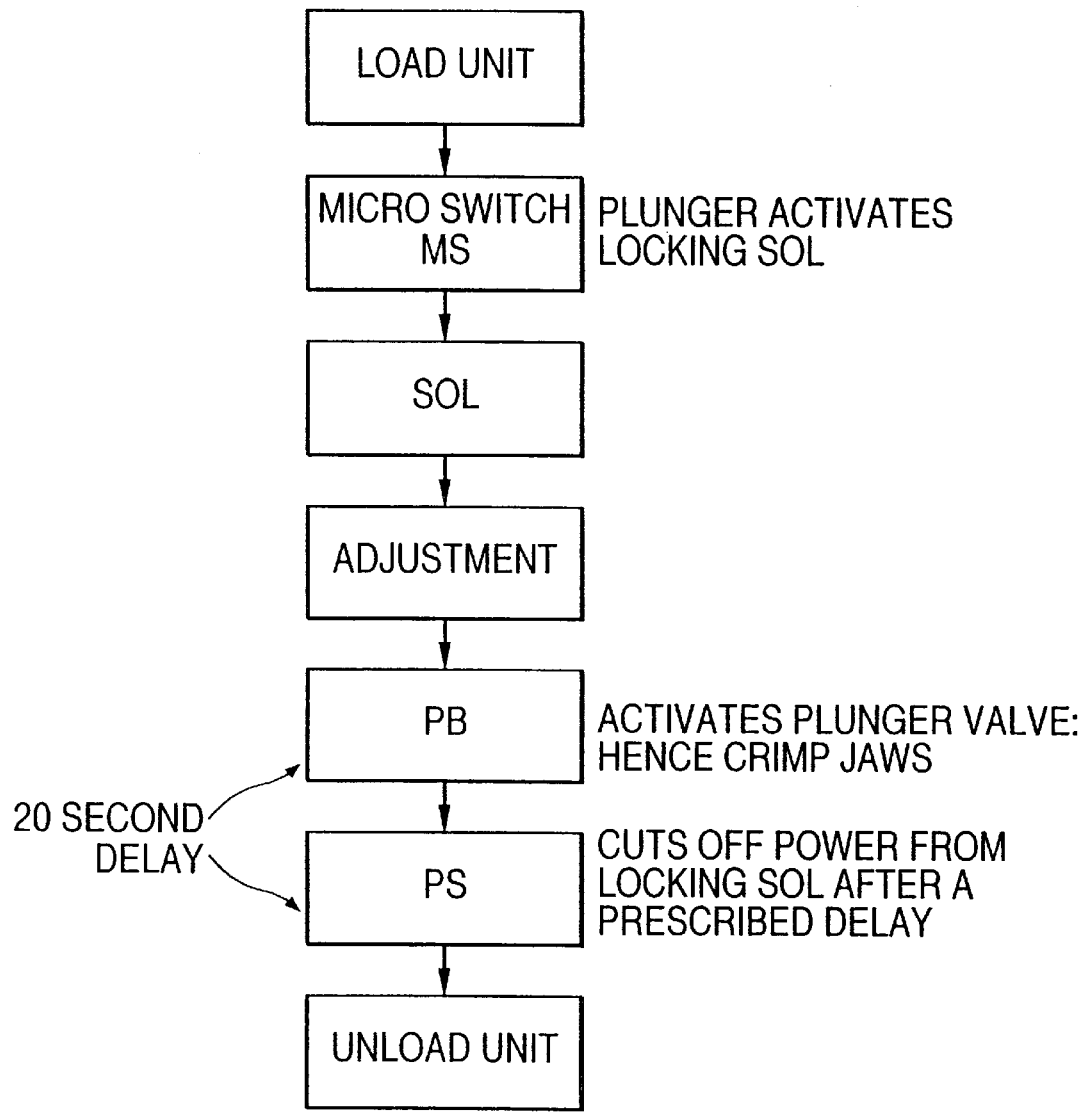
FIG. 17 is a flow chart of operational steps of the method and apparatus of the invention as shown in the embodiment of FIGS. 5–8.

From the aforementioned description of the apparatus 17 taken with the schematic electrical diagram of FIG. 16 and the flow chart of operational steps of FIG. 17, it can be seen that the method of forming a crimped connection between a first tubular member and a second member extending within the first member according to the invention comprises holding at least one of the members to be crimped connected in the fixture so as to prevent the at least one member from being removed from the fixture before a crimped connection between members has been made by the crimper, forming a crimped connection between the members with the crimper and removing the connected members from the fixture. The sequence of operations shown in FIG. 17 further includes initially loading the diaphragm subassembly components in the apparatus in the fixture 18. The microswitch 54 is actuated by a completion of the threaded attachment of the cap 21 on the fixture to activate the electrical solenoid 55 of the locking mechanism 56. Thereafter, the diaphragm subassembly can be biased by the biasing means 28. After this adjustment has been completed the operator presses the push button 50 to move the fixture and diaphragm subassembly downwardly for crimping by the crimper 27. After detection of the operation of the crimper by sensor 52, the electrical power to the locking solenoid is cut off after a prescribed delay, for example twenty seconds, by operation of power switch (PS). Prior to this time, a reverse torque test can be made on the crimped connection if desired. After the delay in the unlocking of the locking mechanism 56, the crimped diaphragm subassembly is unloaded from the fixture 18 for further processing, including assembly in a gas pressure regulator such as regulator 1 in FIG. 1.

Thus, it can be seen that a method and apparatus of the invention prohibit the regulator failure mode caused by the operator's forgetting to crimp the subassembly during its manufacture. Parts handling and assembly time is also minimized as is particle generation for cleanroom application. The crimper of the apparatus also enables fine control of the intensity of the crimp to permit rework on the diaphragm assembly if necessary.

While we have shown and described one embodiment in accordance with the present invention, the invention is not limited to the details thereof as shown and described therein but is susceptible to numerous variations as will be readily understood by the skilled artisan without departing from the spirit of the invention or the scope of the following claims.

We claim:

1. An apparatus for forming a crimped connection between a first, tubular member and a second member extending within said first member, said apparatus comprising a pincerlike crimper including a pair of pincers each having a handle to which a force can be applied and a grasping jaw for exerting a crimping pressure on said members working on a pivot, said grasping jaws including a plurality of crimping elements carried by said grasping jaws for engaging and deforming said first member to form a crimped connection between said first and second members by the application of a force at said handles turning said pincers at said pivot for exerting said crimping pressure, and a fixture for holding said members to be crimped connected, said fixture including a lock mechanism to prevent removal of at least one of the members from said fixture before a crimped connection between said members has been made by said crimper.

2. An apparatus according to claim 1, wherein said grasping jaws are configured to extend about a portion of the outer periphery of said first member during crimping.

3. An apparatus according to claim 1, wherein said plurality of crimping elements are an even number of crimping pins which are arranged opposite one another on respective sides of said first member during crimping as seen in a cross section of said first member perpendicular to a longitudinal axis of said first member.

4. An apparatus according to claim 3, wherein there are four crimping elements, two carried by each grasping jaw.

5. An apparatus according to claim 1, further comprising means responsive to the action of said pincers in forming a crimped connection between said first and second members for unlocking said locking mechanism to permit removal of said members from said fixture.

6. An apparatus according to claim 1, wherein said fixture holds said members to be crimp connected by said pincerlike crimper in a plane perpendicular to a longitudinal axis of said first member.

7. An apparatus according to claim 6, further comprising a frame, said pincers being mounted on said frame for said pivoting movement, a slide mechanism movably connecting said fixture to said frame for movement of the fixture and members held thereby toward and away from said grasping jaws of said pincers to move said members into and out of a position for forming said crimped connection with said pincers.

8. An apparatus according to claim 7, further comprising an actuator for moving said fixture with said members relative to said frame and said grasping jaws by way of said slide mechanism into and out of said position.

9. An apparatus according to claim 7, further comprising a drive mechanism connected to said handles of said pincers for applying a force to pivot said pincers and apply said crimping pressure to said members by way of said crimping elements of said grasping jaws for forming said crimped connection.

10. An apparatus according to claim 6, further comprising means for adjusting the position of said first and second members with respect to each other while said members are held in said fixture prior to forming said crimped connection.

11. An apparatus according to claim 1, further comprising means for adjusting the relative position of said crimping elements with respect to said grasping jaws.

12. An apparatus according to claim 1, further comprising a drive mechanism connected to said handles of said pincers for applying a force to pivot said pincers and apply said crimping pressure to said member by way of said crimping elements of said grasping jaws for forming said crimped connection.

13. An apparatus for forming a crimped connection between an assembly comprising a first, tubular member and a second member extending within the first member, said apparatus comprising a crimper for engaging and deforming said first member to form a crimped connection between said first and second members, a fixture for holding said members to be crimp connected by said crimper, said fixture comprising a base and a lid which are relatively movable for opening and closing said fixture to allow an assembly of said members to be loaded into and unloaded from said fixture when open and to prevent removal of said assembly from said fixture when closed, and a locking mechanism responsive to relative movement of said lid and said base upon closing said fixture to prevent opening of said fixture and removal of said assembly from said fixture before a crimped connection between said members has been made by said crimper.

14. An apparatus according to claim 13, further comprising means responsive to the operation of said crimper in forming a crimped connection between said first and second members for unlocking said locking mechanism to permit removal of said lid from said fixture and said assembly from said fixture.

15. An apparatus for forming a crimped connection between a first, tubular member and a second member extending within the first member, said apparatus comprising a crimper for engaging and deforming said first member to form a crimped connection between said first and second members, a fixture for holding said members to be crimp connected by said crimper, a frame, said crimper being mounted on said frame, and a mechanism movably connecting said fixture to said frame for movement of the fixture and members held thereby toward and away from said crimper to move said members into and out of a position for forming said crimped connection with said crimper.

16. An apparatus according to claim 15, further comprising an actuator for moving said fixture with said members relative to said frame and said crimper by way of said mechanism into and out of said position.

17. An integrated crimp bias apparatus for forming a diaphragm subassembly for a gas pressure regulator, said apparatus comprising a fixture for holding components of a diaphragm subassembly to be biased relative to one another and connected together by a crimped connection between components thereof, means for biasing said components relative to one another, a crimper for engaging and deforming one of said components into another for forming said crimped connection, and a locking mechanism responsive to the presence of at least one of said components in said fixture to prevent removal thereof from said fixture before said crimped connection has been made.

18. An apparatus according to claim 17, wherein said fixture holds diaphragm subassembly components including an annular, flexible metal diaphragm with a diaphragm plate secured to a central portion of said flexible metal diaphragm, a compression member, a valve seat supported by said compression member, and a valve for opening and closing a gas passage through said valve seat, said valve having a valve stem which extends through said gas passage of said valve seat and into an extension of said diaphragm plate which is adapted to be crimped to fix the relative positions of the valve and diaphragm plate in said subassembly, after the flexible metal diaphragm is biased from an initial neutral position toward said compression member and valve seat by said means for biasing.

19. An apparatus according to claim 17, further comprising means responsive to the operation of said crimper in forming said crimped connection for unlocking said locking mechanism to permit removal of said components from said fixture after forming said crimped connection.

20. An apparatus according to claim 17, wherein said one of said components has a tubular member and said another component extends within said tubular member, and wherein said crimper includes a pair of pincers each having a handle to which a force can be applied and a grasping jaw for exerting a crimping pressure on said components to be crimp connected working on a pivot, said grasping jaws including a plurality of crimping elements carried by said grasping jaws for engaging and deforming said tubular member into said another component for forming said crimped connection by the application of a force at said handles turning said pincers at said pivot for exerting crimping pressure on said tubular member.

21. An apparatus according to claim 20, wherein two crimping elements are carried by each of said grasping jaws.

22. An apparatus according to claim 21, further comprising means for adjusting the relative position of said crimping elements with respect to said grasping jaws.

* * * * *